July 20, 1943.    B. L. WATT ET AL    2,324,609
BAND TIGHTENING AND SEALING TOOL
Filed Aug. 10, 1939    2 Sheets-Sheet 2
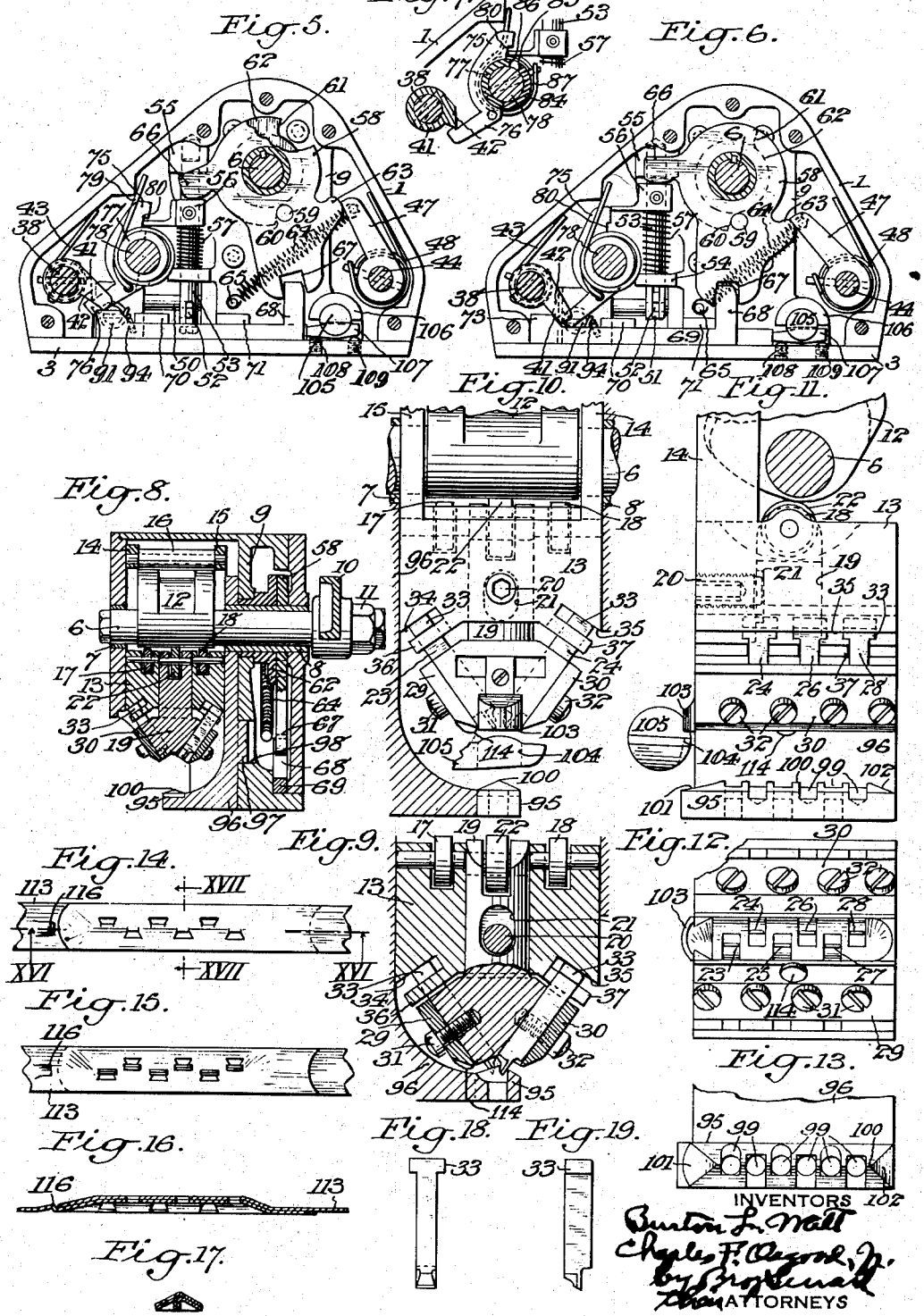
INVENTORS
Burton L. Watt
Charles F. Osgood, Jr.
by
ATTORNEYS Patented July 20, 1943

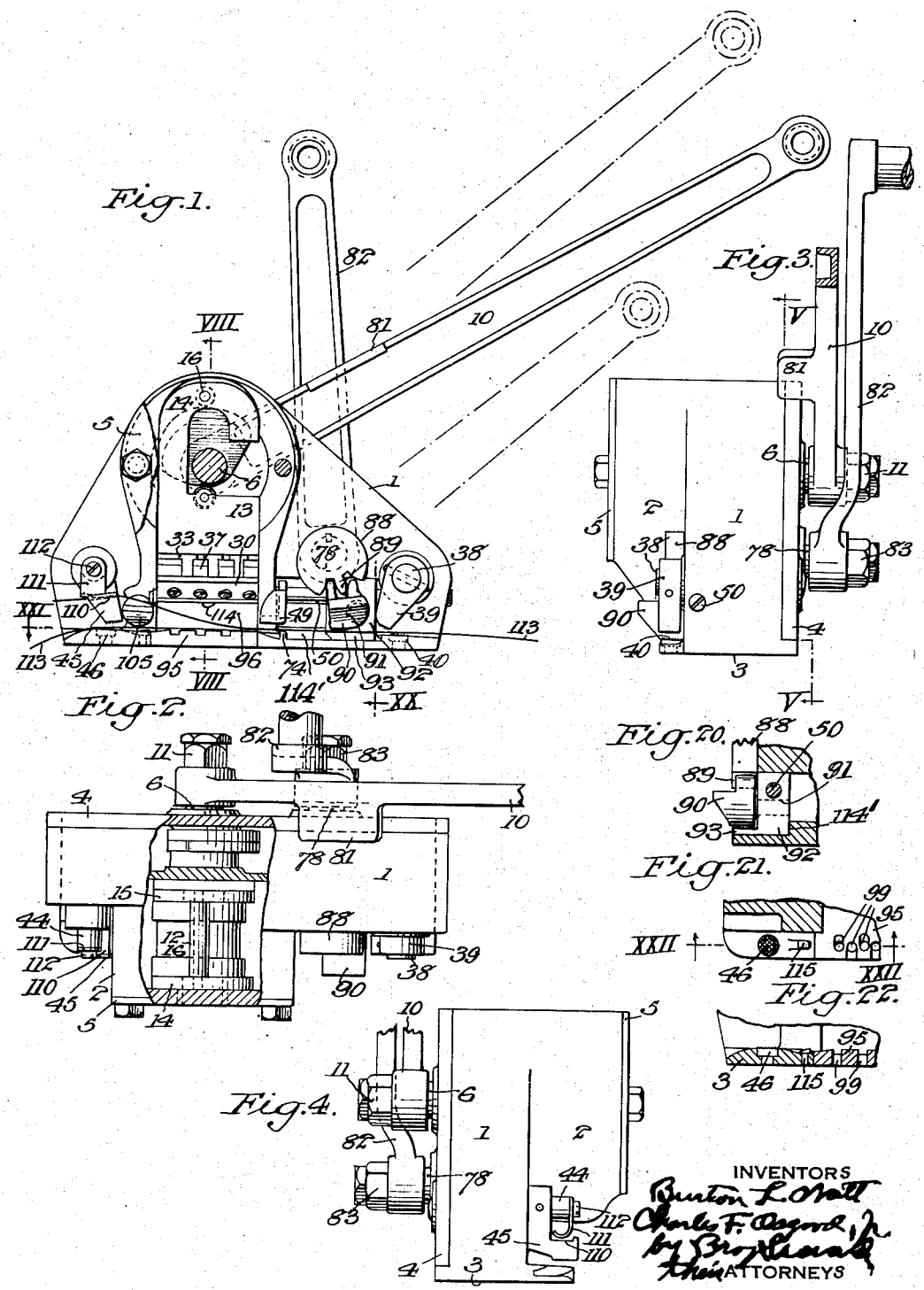

2,324,609

UNITED STATES PATENT OFFICE 2,324,609

BAND TIGHTENING AND SEALING TOOL

Burton L. Watt, Marquette, Mich., and Charles F. Osgood, Jr., Hohokus, N. J., assignors to General Strapping Corporation, New York, N. Y., a corporation of New York Application August 10, 1939, Serial No. 289,352

11 Claims. (Cl. 81—9.1)

This invention relates to a band tightening and sealing tool and has for an object to provide a manually operable device capable of accurately tensioning and sealing a band round a bundle or container with a minimum of physical effort and with a high degree of uniformity.

Another object consists in providing such a device in which a preliminary movement of the manually operable element for actuating the sealing mechanism serves to move certain of the parts to inactive position for permitting operative association of the tool with the band.

Another object consists in providing such a device in which a preliminary movement of the manually operable element for actuating the tensioning mechanism restores said last named parts to active position with respect to the band for cooperation during the tensioning of the band.

Another object consists in providing such a device in which the manually operable element for actuating the tensioning mechanism has a relatively long stroke and is out of contact with the parts that hold the band against reverse movement during tensioning, whereby the opportunity for slippage of the band is eliminated.

Another object consists in providing such a device in which the sealing elements are shaped so as to improve the rigidity and permanency of the seal.

Another object consists in providing such a device in which the sealing elements contact the band successively rather than simultaneously during the sealing movement so as to facilitate manual operation and guard against lack of uniformity in seal in case the operator grows tired or tends to vary the muscular effort exerted.

Another object consists in providing such a device which has improved and simplified means for holding the free or loose end of the strap during the tensioning and sealing operations.

Another object consists in providing such a device that includes means for severing the said free or loose end during the sealing movement, in which the line of severance or cut is so formed as to avoid the likelihood of the severed end that remains on the sealed band catching upon or injuring objects with which the bundle or package may come into contact, and in which waste of bands through inaccuracy of positioning is avoided.

Another object consists in providing such a device that includes improved means for adjusting the cutting or severing mechanism to insure uniformity in operation in spite of wear or other deteriorating cause.

Another object consists in providing such a device in which the operating mechanism is very largely enclosed, and yet is made readily accessible for adjustment, repair, or replacement, by the provision of two easily removable face plates.

A further object consists in providing certain improvements in the form, construction, and arrangement of the several parts whereby the above named and other objects may effectively be obtained.

A practical embodiment of the invention is represented in the accompanying drawings, in which Fig. 1 represents a side view of the device, partly broken away, and with the operating handles shown in different positions in full and dot-dash lines;

Fig. 2 represents a top view of the same, partly broken away;

Fig. 3 represents an end view of the same, partly broken away;

Fig. 4 represents an end view of the same opposite to Fig. 3, partly broken away;

Fig. 5 represents a side view with the operating handles and one face plate removed, and with certain parts broken; the view being taken substantially in the plane of the line V—V of Fig. 3, looking in the direction of the arrows, and the parts being shown in the position represented by the dot-dash lines showing the operating handles in Fig. 1;

Fig. 6 represents a similar view with the parts shown in the position represented by the full lines showing the operating handles in Fig. 1;

Fig. 7 represents a detail section, partly in elevation, showing the relationship of certain parts in the tensioning mechanism;

Fig. 8 represents a transverse section taken in the plane of the line VIII—VIII of Fig. 1, looking in the direction of the arrows;

Fig. 9 represents a similar view on an enlarged scale, with certain of the parts being shown in elevation and with the sealing elements in a different position;

Fig. 10 represents a detail transverse section, partly in elevation, on the same scale as Fig. 9, showing the relationship of the cutting elements and sealing elements;

Fig. 11 represents a similar view taken at right angles to Fig. 10;

Fig. 12 represents a detail inverted plan view of the sealing and cutting elements;

Fig. 13 represents a detail plan view of the anvil with which the sealing and cutting elements cooperate;

Fig. 14 represents a detail plan view of the sealed and severed portion of the band or strap;

Fig. 15 represents an inverted plan view thereof;

Fig. 16 represents a longitudinal section taken in the plane of the line XVI—XVI of Fig. 14, looking in the direction of the arrows;

Fig. 17 represents a transverse section taken in the plane of the line XVII—XVII of Fig. 14, looking in the direction of the arrows;

Fig. 18 represents a side elevation of one of the sealing elements;

Fig. 19 represents a similar view taken at right angles to Fig. 18;

Fig. 20 represents a detail vertical section taken in the plane of the line XX of Fig. 1, looking in the direction of the arrows;

Fig. 21 represents a detail horizontal section taken in the plane of the line XXI of Fig. 1, looking in the direction of the arrow; and Fig. 22 represents a vertical section taken in the plane of the line XXII of Fig. 21, looking in the direction of the arrows.

The tool or device includes a housing that consists of a main body portion 1, a lateral extension 2, a bottom 3, and opposite removable side plates 4, 5.

A shaft 6 (Fig. 8) has one end journaled in a bushing 7 located in an aperture formed in side plate 5, while its other end carries a sleeve 8 that finds a bearing in an aperture in side plate 4 and also in a web 9 that is cast integral with the housing. The last named end of shaft 6 protrudes outside of side plate 4 and has an operating handle 10 keyed thereto and fixed in place by a nut 11.

On an intermediate portion of the shaft 6 is fixed a cam 12 that is adapted to depress and elevate the sealing elements on their operative and inoperative strokes. To this end a vertically movable head 13 is mounted to slide between side plate 5 and web 9. This head has upwardly extending bifurcations 14, 15, which support the ends of a roller 16 that cooperates with cam 12 for the purpose of elevating the head 13 and mechanism carried thereby to inoperative position. A pair of cam rolls 17, 18 (Fig. 9) are mounted in the head 13 below cam 12 for cooperating with it to depress the said head on the downward or operative stroke. From the immediately foregoing description it will be seen that rotative movement of the shaft 6 by means of oscillating handle 10 will vertically reciprocate the head 13 and parts carried thereby.

A plunger 19 is mounted in a vertical bore formed in the lower part of head 13 and secured in position by a pin 20 that is mounted in the head and enters an elongated slot 21 in plunger 19 so as to permit a limited relative vertical movement between the plunger and head. The upper end of the plunger 19 carries a cam roller 22 that is adapted for cooperation with the cam 12 during the downward stroke of this mechanism.

The outline of the cam 12 is shown in Figs. 1 and 11, and, by reference also to Fig. 8, it will be observed that the lower portion of cam 12 has a uniform face but that its upper portion as there shown has the side parts of its face that cooperate with rollers 17, 18, higher than its central part that cooperates with roller 22. It will also be observed that roller 22 is somewhat greater in diameter than rollers 17, 18 and projects slightly above them. As a result of this formation of the said cooperating parts, the effect of the cam during the downward or operative stroke of this mechanism is first to slightly depress plunger 19 in order to insure that pin 20 is at the top of slot 21, then simultaneously depress head 13 and plunger 19, and then continue depressing head 13 without further depressing plunger 19; this relative movement of the plunger and head being permitted by the pin and slot connection 20, 21, as hereinabove indicated. The reason for the preliminary slight depression of plunger 19 is to permit the subsequent depression of the head 13 without corresponding movement of the plunger so as to actuate the sealing elements after the plunger 19 has contacted the strap, as will be set forth.

The lower portion or head of plunger 19 has two series of angularly disposed grooves, three on each side, in which are mounted six punches or sealing elements that are numbered 23, 24, 25, 26, 27, 28 (Fig. 12). The sets of punches are held in position in the plunger 19 by plates 29, 30 that are fastened to the plunger by series of screws 31, 32; and, as well shown in Fig. 18, the plungers have T heads, as indicated at 33, which fit in recesses 34, 35, formed in head 13, while the shanks of the said punches are received in slotted flanges 36, 37 also formed on the head 13. The arrangement of parts just described serves firmly to hold the punches 23 to 28 inclusive in position while permitting reciprocatory sliding movement thereof in the angular grooves in plunger 19, which sliding movement is caused by the relative movement of plunger 19 and head 13 under the influence of cam 12, as already explained, and serves the purpose of punching and sealing the strap or band as will be hereinafter described.

It may be here stated that, in order to facilitate the operation of the punches, they are made slightly different in length, preferably by varying the length of their punching blades; and that this difference in length preferably involves three pairs of the six punches, with the punches of each pair equal in length. Thus, we have found it advantageous to make punches Nos. 24 and 25 the same in length and the longest of any pair; punches Nos. 23 and 28 the same in length and a little shorter than the previously named pair; while punches Nos. 26 and 27 are the same in length and the shortest of the three pairs. While the amount of this difference in length may change within reasonable limits, we find it desirable to make the difference in length between any two pairs about five one-thousandths of an inch. This arrangement serves to provide a successive action of each pair of punches during the operative sealing stroke as distinguished from simultaneous action, and thereby renders the said operation easier to perform from the point of view of muscular power, thus also leading to uniformity because the operation will be firmly and completely effected even though the operative be relatively weary because of the hour of the working day, or otherwise indisposed.

Turning now to the mechanism for tensioning the strap or band, a shaft 38 (Figs. 1, 5 and 6) is journaled in a side of the main body portion 1 of the housing and in side plate 4 and has an outwardly protruding end to which is pinned a foot 39 that is preferably roughened or serrated on its lower extremity for cooperation with a serrated plug 40 that is preferably composed of hardened material and set into a laterally projecting portion of housing bottom 3. The part of shaft 38 that lies within the housing has a dog 41 fixed thereon which has its extremity notched or cut away so as to form a shoulder 42 represented in dotted lines in Figs. 5 and 6. A coil spring 43 surrounds shaft 38 and has one end fixed in the shaft and the other end bearing against the housing, as clearly shown in Figs. 5 and 6, in order normally to urge said shaft in a clockwise direction as the parts are represented in Figs. 5 and 6, and in a counterclockwise direction as the parts are represented in Fig. 1, so as to tend to bring the extremity of foot 39 in cooperative relationship to plug 40 for the purpose of gripping the strap or band during the tensioning operation, as will be set forth.

Another shaft 44 is journaled in the main body 1 of the housing and in side plate 4, near the end of the housing opposite to the location of shaft 38. One end of shaft 44 protrudes laterally from the housing on the same side as the protruding end of shaft 38, and it has fixed thereto a foot 45 which preferably has its lower end serrated for cooperation with a hardened serrated plug 46 that is set into the adjacent lateral extension of housing bottom 3. The portion of shaft 44 that is within the housing has a finger 47 pinned thereto, and a coil spring 48 surrounds said shaft, having one end fast to the pin that secures finger 47 thereon and the other end bearing against housing 1 so as normally to urge shaft 44 in a counterclockwise direction as the parts are represented in Figs. 5 and 6, and in a clockwise direction as the parts are represented in Fig. 1, for the purpose of tending to establish cooperative relationship between foot 45 and plug 46.

A guide 49 for directing the movement of the strap or band to the sealing mechanism projects laterally from the housing to a position in line with foot 39 and foot 45. It is carried and projects laterally from a rod 50 that is mounted in the main body portion 1 of the housing and extends longitudinally thereof for a short distance between the shafts 38 and the sealing mechanism. The said guide has a tail piece 51 that is bifurcated, as shown in Fig. 6, and engages a pin 52 that is carried in the lower slotted end of a plunger 53 which is slidagly mounted in a bracket 54 and a boss 55 that are formed integral with the web 9 of the housing. A latch 56 is fixed near the upper end of plunger 53, and an expansion coil spring 57 is located between the said latch and bracket 54 so as normally to urge the plunger in an upward direction.

A flat member 58 is freely mounted on sleeve 8 adjacent housing side plate 4, and has an inwardly projecting stud 59 that is fitted for engagement with the radial shoulders 60, 61 of a disk 62 that is fast to sleeve 8 and is journaled in housing web 9. As a result of this construction, the sleeve 8 may turn with the shaft 6 under the influence of handle 10 for about 180° without having any effect upon member 58 but, as soon as either shoulder 60 or 61 contacts stud 59, further movement of handle 10 in either direction will move member 58 in the same direction.

The said member 58 is formed with a nose 63 that is designed to abut the extremity of finger 47, and a retractile coil spring 64, which has one end secured to finger 47 and the other end secured to a stud 65 that is fixed to the housing, normally urges finger 47 into engagement with nose 63.

Member 58 also has a lug 66 projecting from the side thereof opposite to nose 63, which lug rests upon latch 56 and is normally held in abutment therewith by the expansive force of spring 57.

The lower part of member 58 is formed with a notch 67 that straddles an upward extension 68 on a slide 69 that rides on the top of housing bottom 3 adjacent side plate 4 to serve as an operative connection between member 58 and dog 41 and is held in place by clips 70 and 71, the former of which is fastened to the top of housing bottom 3, while the latter projects from housing web 9 and has a face that serves to guide the inner side of slide 69, just as side plate 4 guides the outer side of said slide. The end of the slide 69 opposite to that carrying the extension 68 is provided with an enlargement 73 that has slanting and horizontal surfaces, and the spring 43 on shaft 38 normally holds dog 41 in contact with said enlargement 73 on slide 69.

As a result of the arrangement just described, it will be seen that, when handle 10 is moved sufficiently to the right, as indicated by the difference between the dot-dash lines and the full lines in Fig. 1, the member 58 will move the slide 69 to the right in Figs. 5 and 6 until the dog 41 rides up the slanting surface of enlargement 73 and rests upon the horizontal surface thereof while, simultaneously, the nose 63 will swing finger 47 to the right so as to rotate shaft 44; and also, concurrently therewith, lug 66 will depress plunger 53. The movements just described are illustrated by the difference between the positions of the parts in Fig. 6 and Fig. 5, and the riding up of dog 41 onto the horizontal surface of enlargement 73 will swing foot 39 in a clockwise direction, as the parts are represented in Fig. 1, so as to move it out of cooperative relation with plug 40; the movement of finger 47 by nose 63 will swing foot 45 in a counter clockwise direction, so as to move it out of cooperative relation with plug 46; while depressing of plunger 53 will rock rod 50 so as to lift band guide 49 out of cooperative relation with the band support 74 that is formed on the housing bottom 3 immediately below the guide 49. Thus it will be seen that this movement separates or opens the said three pairs of cooperating elements so as to permit the band or strap that is to be tensioned and sealed to be inserted therebetween in the operation of the tool or device, as will be hereinafter described.

Means is provided for temporarily locking certain parts in open position, which means consists of a double latch having an upward extension 75 and a downward extension 76 and a hub 77 that is loosely mounted on a shaft 78 which is journaled in the main body 1 of the housing and in side plate 4, adjacent shaft 38. A coil spring 79 surrounds the hub 77 of the double latch and has one end fixed thereto while the other end bears against a projection on the inside of the main body 1 of the housing, as clearly shown in Figs. 5 and 6, so as normally to urge the latch and shaft 78 on which it is mounted in a clockwise direction as the parts are shown in said figures. When the handle 10 is actuated so as to move the parts from the position shown in Fig. 6 to the position shown in Fig. 5, as above explained, the depressing of plunger 53 will bring latch 56 into register with notch 80 in upward extension 75 of the double latch, whereupon spring 79 will immediately rotate the double latch in a clockwise direction so as to cause the extension 75 to catch the latch 56, as indicated in Fig. 5. This same motion will cause the lower extension 76 to catch shoulder 42 that is on dog 41 so as to hold the latter in the position represented in Fig. 5; with the result that the foot 39 and guide 49 are held in the elevated position shown in Fig. 1.

As soon as the double catch has thus operated, and the handle 10 is manually released, the tension of spring 64 forcing finger 47 against nose 63 will automatically return the member 58 and slide 69 to the position shown in Fig. 6. The tool then is ready to be brought into operative relation with the band or strap by moving it laterally so that the band enters between foot 39 and plug 40 and guide 49 and support 74; and the foot 45 may, at this moment, be separated from its cooperating plug 46 by again manually moving handle 10 to the right, as the parts are shown in Fig. 1 so as to cause nose 63 to swing finger 47 a slight distance in a clockwise direction. To facilitate this movement of the arm 10, a thumb piece 81 is formed thereon at a convenient location for the operative.

After the tool and band or strap have been brought into the relationship just described, the parts 39 and 49 should be released from their elevated positions so as to take their cooperative positions with respect to plug 40 and support 74 respectively. This is accomplished by manipulating a handle 82 that is keyed to shaft 78 and fixed in position thereon by a nut 83. On the said shaft 78, at the side of the double catch away from handle 82, there is pinned a collar 84 which has a shoulder 85 fitted for cooperation with an adjacent shoulder 86 on the hub 77 of the double catch when the shaft 78 is rotated in a counterclockwise direction. See Fig. 7. A spring 87 has one end fixed to the collar 84 and another end bearing against the housing 1 so as normally to urge the collar, and hence the shaft 78, in a clockwise direction. With this arrangement of parts, manipulation of the handle 82 so as to rotate shaft 78 a slight distance in a counterclockwise direction, will bring shoulder 85 in contact with shoulder 86, and thereby turn the double catch in the same direction so as to release its upper extension 77 from the latch 56, and its lower extension 76 from the shoulder 42 on dog 41. The moment this release is accomplished, spring 57 will elevate plunger 53 so as to bring it again into contact with lug 66 on member 58, as shown in Fig. 6. As already indicated, this releasing of the double catch will permit foot 39 and guide 49 to be moved downwardly into operative position by the springs which control them.

The end of shaft 78 which is exterior to the housing 1 and in line with foot 39 has fixed thereto a disk 88 (Fig. 1) that is provided with a gear tooth 89 for engagement with a bifurcated clamp 90 that has an inwardly projecting eccentric stud 91 which is rotatably mounted in a block 92 that is slidably mounted on rod 50 and has a laterally and outwardly projecting lip 93 that rides on housing bottom 3 in line with foot 39 and guide 49. The inner end of the stud 91 is surrounded by a coil spring 94 (Fig. 5) that is secured to the stud and bears against the housing bottom in such a way as normally to urge the stud in a counterclockwise direction, as the parts are shown in Fig. 1, for the purpose of bringing the left-hand edge of clamp 90 into operative relationship with lip 93.

Manipulation of the handle 82 will, by imparting rotative movement to the shaft 78, slide block 92 and clamp 90 carried thereby because of the interengagement of gear tooth 89 with the said clamp and, therefore, oscillation of the said handle 82 will reciprocate the said block and clamp, which motion is made use of in the tensioning of the strap or band, as will be explained.

The device also includes an anvil or counter block for cooperation with the punches 23 to 28 inclusive of the sealing mechanism, which anvil is denoted by 95 (Fig. 13) and is formed integral with a substantially J-shaped piece 96 that is fastened in the housing by a stud 97 that fits snugly in an orifice 98 formed in web 9 of the housing. See Fig. 8. The arrangement is such that the anvil proper 95 sets into a gap in the lateral extension of the housing bottom 3 so as to be in line with the plugs 40 and 46, support 74, and lip 93 that cooperate with the foot 39, foot 45, guide 49 and clamp 90. See Fig. 1. As well shown in Fig. 13, the upper surface of the anvil is provided with six recesses, collectively marked 99, that are staggered and fitted to receive the extremities of the punches 23 to 28 inclusive as the latter pass through the band or strap for the sealing operation. The top of the anvil is also tapered upwardly from each side to a central longitudinal ridge 100, and the ends thereof are beveled as indicated at 101 and 102; which shape is for the purpose of giving a corresponding formation to the seal of the band or strap, as illustrated in Figs. 14 to 17 inclusive, which formation promotes rigidity of the seal and tends to prevent entanglement of the upper end of the strap with other objects that may come in contact therewith.

For the purpose of severing the free and unused end of the strap or band, the plunger 19 carries a curved knife 103 (Fig. 11) that cooperates with a correspondingly shaped cutter 104 which has a round shank 105 that is journaled in an upper half-bearing 106 (Figs. 5 and 6) that is cast integral with the housing 1 and cooperates with a lower support 107 which is carried by a pair of screws 108, 109 threaded into housing bottom 3. Said support 107 lies in a transverse slot formed in shank 105 and it will be seen that, by elevating one of the screws 108, 109 and depressing the other, the said shank may be rotated and the cutter 104 thereby adjusted with respect to the knife 103 in order to compensate for wear or other cause that may disturb the proper relationship of said parts. The shape of the cutting parts 103, 104, imparts a curved end to the sealed strap or band, as well shown in Figs. 14 and 15, which tends to promote snug contact of the said end with the body of the strap to prevent curling up of the side edges thereof, and thereby to obviate entanglement with other objects.

Before it is severed, the free end of the strap is supported on a grooved shoulder 110 formed on the foot 45 and is frictionally held in place thereon by the inturned lower edge of a curved clamping spring 111 that is fixed by a screw 112 on the end of shaft 44.

While the operation of the parts has been described in some detail in connection with the foregoing mechanical explanation, it may be advantageous here to summarize the same by noting that, in operation, the strap or band denoted by 113 (Fig. 1) is placed around the bundle, container or other article to be bound with its free ends on the top thereof. The tool is then set in place adjacent the strap or band and the handle 10 moved to the position shown in full lines in Fig. 1 so as to swing foot 39 and guide 49 and latch them out of cooperative relationship with plug 40 and support 74, to permit the entrance of the band or strap therebetween. After the foot 39 and guide 49 are thus latched out of operative position, the handle 10 is automatically returned by spring 64 to the position shown in dot and dash lines in Fig. 1. The operative again moves the arm 10 from the said dot and dash line position toward the full line position by pressing upon thumb piece 81 so as to raise foot 45 from cooperative relationship with plug 46. He simultaneously pulls handle 82 a slight distance to the left from its full line position as shown in Fig. 1, thereby rocking clamp 90 on its stud 91 so as to move it out of contact with lip 93. With the parts in this position, the tool is moved laterally with respect to the strap or band, or the band is moved with respect to the tool, so as to bring the ends of the band into the position shown in Fig. 1 wherein the ends are overlapped on the anvil 95 and the upper end that is to be severed lies over cutter 104 and is frictionally clamped on shoulder 110 of foot 45 by spring 111.

The operative now moves handle 82 a slight distance to the right from the full line position shown in Fig. 1 to permit clamp 90 to be restored by its spring to cooperative position with respect to lip 93 and to release double catch 75, 76, 77, as previously described, and permit foot 39 and guide 49 to be returned by their springs so as to clamp the strap or band upon the plug 40 and hold it on the support 74. He also releases pressure upon the thumb piece 81 of handle 10 to permit foot 45 to be returned by its spring into cooperative relationship with plug 46.

It will be seen that the underneath end of the strap or band is now firmly clamped by foot 45, and the parts are in condition for tensioning the band by pulling upon the other end, which is accomplished by oscillating handle 82 between the full line position and the dot and dash line position. As the handle 82 is swung to the right from its full line position, the clamp 90 and lip 93 will slide to the left in Fig. 1, and thereby pull the end of the band clamped therebetween in the same direction, which motion is permitted by foot 39 because it will swing to the left under the influence of the movement imparted to the band. On the return stroke of the clamp and slide, the foot 39 will instantly grip the band between it and plug 40 thereby preventing any return movement of the band, whereas the band will slide between clamp 90 and lip 93 because the former is free to swing slightly in a counter-clockwise direction during this movement. Repetition of the operation just described will tension the band bit by bit until it is as taut as desired; and it will be understood that, during this procedure, spring 111 will permit the upper free end of the band to slide on shoulder 110 of foot 45 because of the angular relationship of the said parts and the fact that the spring merely has a frictional grip upon the band.

Thereupon it is in order to seal the band and sever the excess free end, which is accomplished by swinging the handle 10 from its full line position shown in Fig. 1 far over to the left, thereby depressing the head 13 and plunger 19 which carry the punches 23 to 28 inclusive and the blade 103 in a downward direction until, through cooperation with the anvil 95 and the cutter 104, the overlapping portions of the strap or band are sealed and the free end severed, as represented in Figs. 14 to 17 inclusive. Simultaneously the said overlapping portions of the band are given the formation represented in the said figures. In this connection it will be observed that the perforations formed in the band by the punches are keystone shaped so that the tongues of the band metal thus produced provide a very effective seal or interlocking engagement. In order to facilitate this sealing and severing step, the overlapped portions of the strap are pressed firmly together immediately before the action of the punches, by a projection 114 (Fig. 12) that is carried by plate 29 and extends slightly below the punches when in their retracted position.

After the strap or band has been sealed and severed, the handle 10 is returned to the dash and dot position represented in Fig. 1, and it and handle 82 are manipulated so as to release the band from gripping contact by foot 39, clamp 90, guide 49 and foot 45; whereupon the tool is moved laterally away from the sealed band, and is ready for action upon another strap or band.

In order to brace the block 92 against inward movement when pressure is exerted upon lip 93, the block is backed by a wall 114' (Fig. 20) that is formed integral with housing bottom 3, and which also serves to stiffen the latter.

Three of the six punch receiving recesses 99, specifically the first, third, and fifth from the left as the parts are shown in Fig. 13, are bored through the anvil 95 to facilitate the cleaning out of steel chips or filings attendant upon the operation of the tool.

For the purpose of improving the seal, the housing bottom 3 has formed thereon an uprising hump 115 (Figs. 1, 21 and 22), which is located immediately below the shank 105 of lower cutter 104 and serves to form a slight crimp 116 in the strap 113 (Figs. 14, 15, 16) when the latter is severed in order to protect the upper end of the strap and prevent it from catching upon other objects when the sealed bundle or package is moved.

It should be noted that the coacting parts are preferably composed of hardened material, such as suitable steel, and that the construction is such as to permit takeup for wear and ready replacement in case of excessive wear or breakage.

It will be understood that various changes may be resorted to in the form, construction, arrangement and material of the several parts without departing from the spirit and scope of our invention, and hence we do not intend to be limited to the details herein shown and described except as they may be included in the claims.

What we claim is:

1. A device of the character described comprising, means for holding portions of a strap in overlapping position, means for sealing said overlapped portions to each other and for severing the excess portion of the strap, said severing means including cooperating movable and stationary elements, the stationary element being rotatably mounted at an angle to the line of movement of the movable element, and means to adjust said stationary element in a rotary direction for bringing the elements into and maintaining them in precise cooperative relationship.

2. A device of the character described comprising, means for holding portions of a strap in overlapping position, means for sealing said overlapped portions to each other and for severing the excess portion of the strap, said severing means including cooperating movable and stationary elements, the stationary element having its longitudinal axis at an angle to the line of movement of the movable element, a supporting member for said stationary element lying at an angle to the said axis of the stationary element, and means for elevating and depressing the extremities of said member to adjust the stationary element about its said axis for bringing the elements into and maintaining them in precise cooperative relationship.

3. A device of the character described comprising, means for holding portions of a strap in overlapping position including a clamping mechanism and a guiding mechanism, means for sealing said overlapped portions to each other, a lever interconnected with said sealing means for operating it, a slide in operative contact with said lever and said clamping mechanism, and a rod and plunger in operative contact with said lever and said guiding mechanism, whereby said lever is adapted to move said clamping and guiding mechanisms to inoperative positions following operation by said lever of the sealing means.

4. A device of the character described comprising, means for holding portions of a strap in overlapping position including a clamping mechanism and a guiding mechanism, means for sealing said overlapped portions to each other, a lever interconnected with said sealing means for operating it, a slide in operative contact with said clamping mechanism, a rod and plunger in operative contact with said guiding mechanism, and a common element in operative contact with said lever, said slide and said plunger, whereby said lever is adapted to move said clamping and guiding mechanisms to inoperative positions following operation by said lever of the sealing means.

5. A device of the character described comprising, means for holding portions of a strap in overlapping position including a clamping mechanism and a guiding mechanism, means for sealing said overlapped portions to each other, a lever interconnected with said sealing means for operating it, a slide in operative contact with said clamping mechanism, a rod and plunger in operative contact with said guiding mechanism, and a common element establishing operative contact between said slide and said plunger and having a lost motion connection with said lever for actuation during part of the stroke of the lever, whereby said lever is adapted to move said clamping and guiding mechanisms to and lock them in inoperative positions following operation by said lever of the sealing means.

6. A device of the character described comprising, means for holding portions of a strap in overlapping position including gripping mechanism for one portion of the strap and clamping and guiding mechanisms for another portion of the strap, means for sealing said overlapped portions to each other, a lever interconnected with said sealing means for operating it, a finger in operative contact with said gripping mechanism, a rod and plunger in operative contact with said guiding mechanism, a slide in operative contact with said clamping mechanism, and a common element connected with said lever and in operative contact with said finger, said plunger and said slide, whereby said lever is adapted to move said gripping, guiding and clamping mechanisms to inoperative positions following operation by said lever of the sealing means.

7. A device of the character described comprising, means for holding portions of a strap in overlapping position including gripping mechanism for one portion of the strap and clamping and guiding mechanisms for another portion of the strap, means for sealing said overlapped portions to each other, a lever interconnected with said sealing means for operating it, a finger in operative contact with said gripping mechanism, a rod and plunger in operative contact with said guiding mechanism, a slide in operative contact with said clamping mechanism, and a common element in operative contact with said finger, said plunger and said slide and having a lost motion connection with said lever for actuation during part of the stroke of the lever, whereby said lever is adapted to move said gripping, guiding and clamping mechanisms to and lock them in inoperative positions following operation by said lever of the sealing means.

8. A device of the character described comprising, means for holding portions of a strap in overlapping position including a clamping mechanism and a guiding mechanism, means for sealing said overlapped portions to each other, a lever interconnected with said sealing means for operating it, and an element in operative contact with said clamping and guiding mechanisms, said lever being also interconnected with said element for moving said clamping and guiding mechanisms to inoperative positions following operation by said lever of the sealing means.

9. A device of the character described comprising, mechanism for gripping one end of a strap, means for tensioning the strap by pulling on the other end and causing it to overlap the first named end, clamping mechanism for holding said other end in tensioned position, means for sealing said overlapped ends to each other, a lever interconnected with said sealing means for operating it, and an element in operative contact with said gripping and clamping mechanisms, said lever being also interconnected with said element for moving said gripping and clamping mechanisms to inoperative positions following operation by said lever of the sealing means.

10. A device of the character described comprising, mechanism for gripping one end of a strap, means for tensioning the strap by pulling on the other end and causing it to overlap the first named end, guiding mechanism for said strap during tensioning, clamping mechanism for holding said other end in tensioned position, means for sealing said overlapped ends to each other, a lever interconnected with said sealing means for operating it, and an element in operative contact with said gripping, guiding and clamping mechanisms, said lever being also interconnected with said element for moving said gripping, guiding and clamping mechanisms to inoperative positions following operation by said lever of the sealing means.

11. A device of the character described comprising, means for holding portions of a strap in overlapping position including a clamping mechanism and a guiding mechanism, means for sealing said overlapped portions to each other, a lever interconnected with said sealing means for operating it, an element in operative contact with said clamping and guiding mechanisms, said lever being also interconnected with said element for moving said clamping and guiding mechanisms to inoperative positions following operation by said lever of the sealing means, and means for locking said mechanisms in inoperative positions.

BURTON L. WATT.
CHAS. F. OSGOOD, Jr.